(12) United States Patent
Afshari (10) Patent No.: US 11,655,831 B2
(45) Date of Patent: *May 23, 2023

(54) MOTOR OPERATED ACCUMULATOR

(71) Applicant: Project Phoenix, LLC, Mesa, AZ (US)

(72) Inventor: Thomas Afshari, Mesa, AZ (US)

(73) Assignee: PROJECT PHOENIX, LLC, Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,316

(22) Filed: Mar. 8, 2021

(65) Prior Publication Data

US 2021/0301837 A1    Sep. 30, 2021

Related U.S. Application Data

(63) Continuation of application No. 16/325,530, filed as application No. PCT/US2017/047182 on Aug. 16, 2017, now Pat. No. 10,975,891.

(Continued)

(51) Int. Cl.
*F15B 1/04* (2006.01)
*H02K 7/06* (2006.01)
(Continued)

(52) U.S. Cl.
CPC ............... *F15B 1/04* (2013.01); *F04B 17/03* (2013.01); *F04B 23/02* (2013.01); *F15B 21/008* (2013.01);
(Continued)

(58) Field of Classification Search
CPC .... F15B 2201/31; F15B 1/24; F15B 2201/40; F16H 2025/2078; F04B 17/03; H02K 7/06

See application file for complete search history.

(56) References Cited

U.S. PATENT DOCUMENTS 3,136,224 A    6/1964  Escobosa
3,264,502 A    8/1966  Lytle et al.
(Continued)

FOREIGN PATENT DOCUMENTS

CA    2236535 A1    11/1999
CA    2495472 A1    7/2006
(Continued)

OTHER PUBLICATIONS

International Search Report and Written Opinion of International Application No. PCT/US2017/047182; dated Nov. 28, 2017; 14 pages.
(Continued)

*Primary Examiner* — Dustin T Nguyen
(74) *Attorney, Agent, or Firm* — Perkins Coie LLP (57) ABSTRACT

An accumulator for storing fluid that includes a shell that defines an interior volume of the accumulator. The shell includes at least one port for providing fluid to a fluid system. The accumulator also includes an accumulator shaft disposed in the interior volume and extending at least partially across the interior volume from a first interior surface of the shell along a longitudinal axis of the shell, e.g., a central axis. The accumulator includes a piston-plate disposed in the interior volume such that the piston-plate and a second interior surface of the shell define a chamber in the interior volume. The accumulator further includes a motor disposed in the interior volume. The accumulator is configured such that rotational movement of the motor translates to linear movement of the piston-plate along the accumulator shaft.

19 Claims, 6 Drawing Sheets

Related U.S. Application Data (60) Provisional application No. 62/375,946, filed on Aug. 17, 2016.

(51) Int. Cl.

| | | |
|---|---|---|
| *F15B 21/00* | (2006.01) | |
| *F04B 17/03* | (2006.01) | |
| *F04B 23/02* | (2006.01) | |
| *F16H 25/20* | (2006.01) | |
| *H02K 7/14* | (2006.01) | |

(52) U.S. Cl.
CPC ............... *F16H 25/20* (2013.01); *H02K 7/06* (2013.01); *F15B 2201/20* (2013.01); *F15B 2201/31* (2013.01); *F15B 2201/40* (2013.01); *F16H 2025/2075* (2013.01); *H02K 7/14* (2013.01)

(56) References Cited

U.S. PATENT DOCUMENTS

| | | | |
|---|---|---|---|
| 4,016,719 A | | 4/1977 | Yavnai |
| 4,030,403 A | | 6/1977 | Elser |
| 4,418,610 A | | 12/1983 | Holtrop |
| 4,560,894 A | | 12/1985 | Stoll |
| 4,848,184 A | | 7/1989 | Ulbing |
| 5,026,248 A | | 6/1991 | Hamilton |
| 5,540,495 A | * | 7/1996 | Pickel ................ B29C 45/5008 366/78 |
| 6,002,186 A | | 12/1999 | Coutu et al. |
| 6,796,120 B2 | | 9/2004 | Franchet et al. |
| 6,979,185 B2 | | 12/2005 | Kaempe |
| 7,191,593 B1 | | 3/2007 | Ho |
| 8,277,205 B2 | * | 10/2012 | Mellet ...................... F15B 1/24 417/415 |
| 9,051,974 B2 | * | 6/2015 | Gramann ............... F16D 29/005 |
| 9,416,533 B2 | * | 8/2016 | Takahashi ................. F16F 9/12 |
| 10,975,891 B2 | * | 4/2021 | Afshari ................. F15B 21/008 |
| 2006/0001202 A1 | | 1/2006 | Bauman |
| 2008/0141803 A1 | * | 6/2008 | Christensen .......... F16H 57/027 74/89.4 |
| 2008/0314708 A1 | * | 12/2008 | Eulenbach ............. B60G 13/06 188/314 |
| 2010/0226806 A1 | | 9/2010 | Mellet et al. |
| 2012/0217117 A1 | | 8/2012 | Gramann et al. |
| 2013/0091833 A1 | | 4/2013 | Zhan et al. |
| 2014/0130487 A1 | | 5/2014 | Akiyama et al. |
| 2015/0184426 A1 | | 7/2015 | Arlinghaus et al. |
| 2018/0323678 A1 | | 11/2018 | Niemann |

FOREIGN PATENT DOCUMENTS

| | | |
|---|---|---|
| CN | 104454803 A | 3/2015 |
| DE | 3247004 A1 | 6/1984 |
| DE | 3821321 A1 | 12/1989 |
| DE | 102011076127 A1 | 11/2012 |
| EP | 2495159 A1 | 9/2012 |
| GB | 1450436 A | 9/1976 |
| JP | H0623687 A | 2/1994 |
| JP | 2003088083 A | 3/2003 |
| WO | 2008027884 A2 | 3/2008 |
| WO | 2008060681 A2 | 5/2008 |
| WO | 2010035244 A2 | 4/2010 |
| WO | 2013027620 A1 | 2/2013 |
| WO | 2014060760 A2 | 4/2014 |
| WO | 2014201340 A1 | 12/2014 |

OTHER PUBLICATIONS

Extended European Search Report for European Application No. 220202305.3; dated Jan. 25, 2023; 7 pages.

\* cited by examiner

MOTOR OPERATED ACCUMULATOR

REFERENCE TO RELATED APPLICATIONS

This application is a continuation of U.S. patent application Ser. No. 16/325,530, filed Feb. 14, 2019, which is a 371 national phase application of International Patent Application No. PCT/US2017/047182, filed Aug. 16, 2017, which claims the benefit of U.S. Provisional Patent Application No. 62/375,946 filed Aug. 17, 2016, each of which applications is incorporated herein by reference in its entirety.

TECHNICAL FIELD

The present invention relates generally to accumulators. More particularly, the present invention relates to accumulators used for fluid storage in open and closed-loop fluid systems such as, e.g., hydraulic systems.

BACKGROUND OF THE INVENTION

An accumulator for an incompressible fluid, such as a hydraulic fluid, is a pressure storage reservoir in which the incompressible fluid is held under pressure, i.e., "charged," by a force from, e.g., a spring or compressed gas. Accumulators inject stored energy (e.g., in the form of pressurized fluid) back into the fluid system when needed. Accumulators are in widespread use in most sectors of hydraulics, machinery, and automations. They are versatile, improve machines' comfort, protect hydraulic systems and are used to increase the energy efficiency of hydraulic systems. For example, using an accumulator as an energy storage device effectively reduces the required flow rate capacity of a fluid pump, which results in a reduction of the installed power. When charged, an accumulator allows for instant and/or repetitive operations as required (braking, opening of a door, or some other repetitive operation based on the application).

In some fluid system the accumulator helps dampen pulsations and reduces noise in the fluid system, which are caused by, e.g., the pulsations of a pump. Due to the low inertia of an typical accumulator, e.g. a bladder-type accumulator, the accumulator can quickly adjust for these pressure changes and improve the precision of operation and reduce the noise level of the system. In closed-loop systems, an accumulator can store/release fluid to account for pressure differences caused by thermal variation in the closed circuit. In high-volume flow systems, an accumulator that is correctly sized and located within the system provides protection from surge and water hammer damage by transforming the pressure wave oscillations into liquid mass oscillations, which are easily absorbed by the accumulator to bring the pressure peak level back to an acceptable level. On industrial machines such as maintenance machinery and transport platforms, an accumulator that is connected to the suspension chamber acts as an adjustable shock absorber. In addition to the above, depending on the application, accumulators can provide suction flow stabilization, volume and leakage adjustment, weight equalization, energy recovery and recuperation.

Some common type of accumulators are bladder-type accumulators, diaphragm-type accumulators and piston-type accumulators. Bladder-type accumulators include a shell and a bladder disposed inside the shell. The bladder is charged with a compressed gas such as nitrogen, air or another gas. When the pressure in the fluid system is higher than the pressure in the bladder-type accumulator, fluid is forced into the accumulator, which compresses the bladder until the system pressure equals the pressure of the nitrogen in the bladder. When the system pressure drops below that of the compressed gas, the compressed gas expands and forces the stored fluid into the fluid circuit until the pressures equalize one again. Diaphragm-type accumulators use a flexible member to separate two chambers of the accumulator. One chamber is filled with compressed gas and the other is connected to the fluid circuit. Similar to bladder-type accumulators, differences in pressure between the compressed gas and the system fluid will cause the fluid to enter or exit the accumulator. Finally, a third type of accumulator, the piston-type of accumulator, uses a rigid piston to separate two chambers of the accumulator. Similar to the bladder-type accumulator, one chamber is filled with compressed gas and the other is connected to a fluid circuit. The piston is designed to slide along the wall of the accumulator when there is a pressure difference between the compressed gas and the fluid circuit. By sliding, the piston allows fluid to enter and exit the accumulator.

The accumulators discussed above have various safety and maintenance issues. Diaphragm and bladder type accumulators experience wear and tear due to the mechanical cycling. In addition to the stresses caused by mechanical cycling, the diaphragm also experiences thermal stresses due to temperature changes from the gas being compressed and expanded during operation. In addition, the gas in the above accumulators are always under pressure, which can mean that some or all of the hydraulic system equipment is always under pressure. That is, the accumulator and system can have trapped pressure even when no operation is taking place. Thus, the accumulators and the system equipment must be configured to withstand the trapped pressure on a 24-hour basis and not just when the equipment is being operated. This means that, for safety reasons, the wall thicknesses of the accumulators and the system equipment will be greater than if the pressure in the accumulators was only applied during operation. Further, because the gas is always under pressure in the above accumulators, the accumulators must be specifically pre-configured to each application. Accordingly, the same accumulator configuration cannot be used for a variety of pressure and volume flow conditions. Indeed, the accumulators cannot even adjust to any significant changes in the same application. For example, changes in the volume, pressure and/or response times in the system due to, e.g., equipment changes in the system due to, e.g., upgrades.

Further limitations and disadvantages of conventional, traditional, and proposed approaches will become apparent to one skilled in the art, through comparison of such approaches with embodiments of the present invention as set forth in the remainder of the present disclosure with reference to the drawings.

SUMMARY OF THE INVENTION

Exemplary embodiments of the present invention provide for a motor operated accumulator. In some exemplary embodiments, the accumulator includes a shell that defines an interior volume having a length and a width. Preferably, the shell includes at least one port for providing fluid communication with a fluid system. The accumulator also includes an accumulator shaft disposed in the interior volume along a longitudinal axis of the shell, e.g., a central axis. Preferably, the accumulator shaft extends from a first interior surface of the shell and least partially across the interior volume along the central axis of the shell. In some exemplary embodiments, the accumulator shaft extends fully across the interior volume. Preferably, the accumulator includes a piston-plate in the interior volume disposed such that the piston-plate and a second interior surface of the shell define a chamber in the interior volume for storing a fluid. Preferably, the shell includes a main body and at least one endplate attached to the main body. Preferably, the accumulator shaft extends from an endplate. In some exemplary embodiments, the main body is a cylinder and the shell includes two endplates attached to each end of the cylindrically shaped main body. Preferably, the accumulator shaft extends from one endplate to the other.

Preferably, fluid flow to and from the chamber is accomplished by varying the volume of the chamber. As used herein, "fluid" means an incompressible liquid or a substantially incompressible liquid, e.g., an incompressible liquid having some entrained gas but not enough to substantially affect the incompressible nature of the fluid mixture. The volume of the chamber is varied by changing a position of the piston-plate along the accumulator shaft, e.g., by linearly moving the piston-plate along the axis of the shell, which can be the central axis. Preferably, the accumulator further includes a motor disposed such that the motor shaft interfaces to the accumulator shaft and an outer radial surface of the motor interfaces to an interior surface of the shell. Preferably, rotational movement of the motor translates to linear movement of the piston-plate along the accumulator shaft to vary the volume of the chamber. Decreasing the chamber volume injects fluid into the system via the at least one port and increasing the chamber volume forces fluid from the system via the at least one port into the chamber for storage. In some exemplary embodiments, the accumulator stores hydraulic fluid for use in a closed-loop or open-loop hydraulic system.

Preferably, the motor is disposed in the interior volume. Preferably, the motor is disposed between the piston-plate and the first inner surface of the shell. In some exemplary embodiments, the piston-plate is a part of the housing (or casing) of the motor. For example, the piston-plate can be part of the motor casing that is disposed on a plane that is perpendicular to the longitudinal axis of the shell, which can be the central axis. That is, a flat side of the motor casing is the piston-plate and movement of the motor varies the chamber volume. In some embodiments, when an outer-rotor type motor is used, the outer radial surface of the motor includes threads that match with threads disposed on the inner surface of the shell. In some exemplary embodiments, when an inner-rotor type motor is used, the accumulator shaft and the motor shaft have a threaded interface. In some exemplary embodiments, the piston-plate can be separate from the motor, e.g., a disk that is coupled to the motor. The coupling is such that rotational movement of the motor translates to a corresponding linear movement of the piston-plate. In some exemplary embodiments where the piston-plate is separate from the motor, the motor can be stationary, i.e., does not move linearly. In some exemplary embodiments, the outer radial surface of the piston-plate includes threads that match with threads disposed on the inner surface of the shell. In other exemplary embodiments, the accumulator shaft and a center hub of the piston-plate have a threaded interface. In some exemplary embodiments, the motor is located outside the shell and coupled to the disk. In some exemplary embodiments, the motor is a bi-directional, low-speed high-torque motor. In some embodiments, the motor is a transverse flux motor. In some exemplary embodiments, the motor is a servomotor.

In another exemplary embodiment, a fluid system, e.g., a hydraulic system, includes a fluid-driven actuator, e.g., a hydraulic cylinder, a hydraulic motor, or another type of fluid-driven actuator. The fluid system also includes a pump to operate the fluid-driven actuator. The system further includes an accumulator that includes a shell. The accumulator also includes an accumulator shaft disposed in an interior volume of the accumulator along a longitudinal axis of the shell, e.g., a central axis. Preferably, the accumulator includes a piston-plate disposed in the interior volume such that the piston-plate and an inner surface of the shell define a chamber to store fluid in the accumulator. Preferably, the accumulator further includes a motor disposed such that rotational movement of the motor translates to linear movement of the piston-plate along the accumulator shaft. The accumulator is configured such that, as a position of the piston-plate along the accumulator shaft changes, a volume of the chamber that stores the fluid also varies. The system further includes a controller that operates the motor to establish the position of the piston-plate along the accumulator shaft to control at least one of a magnitude, a direction and a duration of at least one of a pressure boost and a flow boost in the fluid system.

Another exemplary embodiment relates to a method of injecting fluid into a fluid system from an accumulator and extracting fluid from the fluid system into the accumulator. The accumulator has a shell defining an interior volume of the accumulator. A piston-plate is disposed in the interior volume such that the piston-plate and an inner surface of the shell define a chamber to store fluid in the accumulator. The method includes rotating the motor to linearly move the piston-plate along the accumulator shaft to vary a volume of the chamber. The method also includes decreasing the volume in the chamber to inject fluid stored in the chamber into the fluid system and increasing the volume in the chamber to receive fluid from the fluid system for storage in the chamber. In some exemplary embodiments, the system, which can be a closed-loop or an open-loop system, is a hydraulic system.

The summary of the invention is provided as a general introduction to some embodiments of the invention, and is not intended to be limiting to any particular accumulator, fluid system or hydraulic system configuration. It is to be understood that various features and configurations of features described in the Summary can be combined in any suitable way to form any number of embodiments of the invention. Some additional example embodiments including variations and alternative configurations are provided herein.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the preferred embodiments of the invention.

DETAILED DESCRIPTION OF THE PREFERRED EMBODIMENTS

Figure 1:
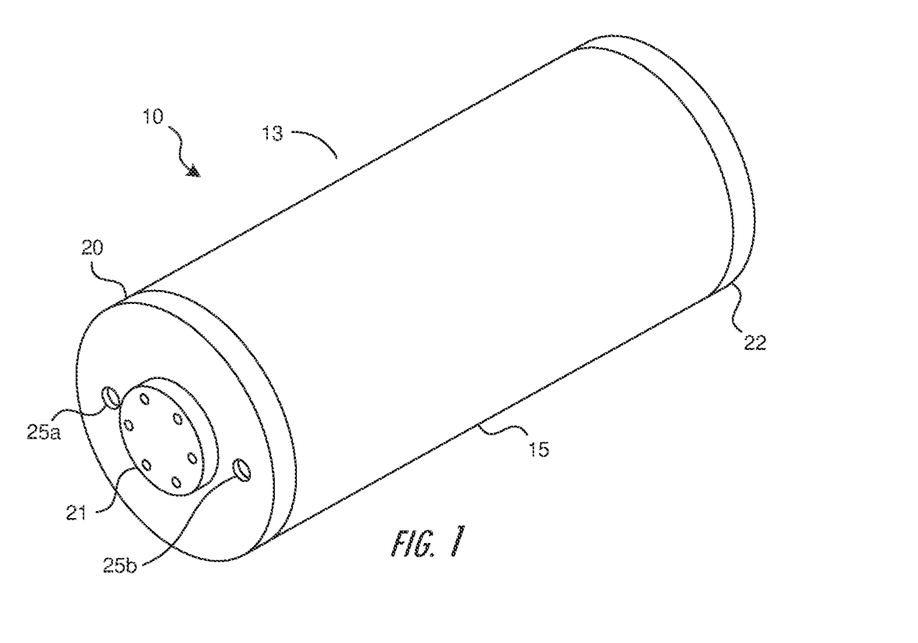
FIG. 1 is perspective view of an exemplary embodiment of an accumulator.
Figure 2:
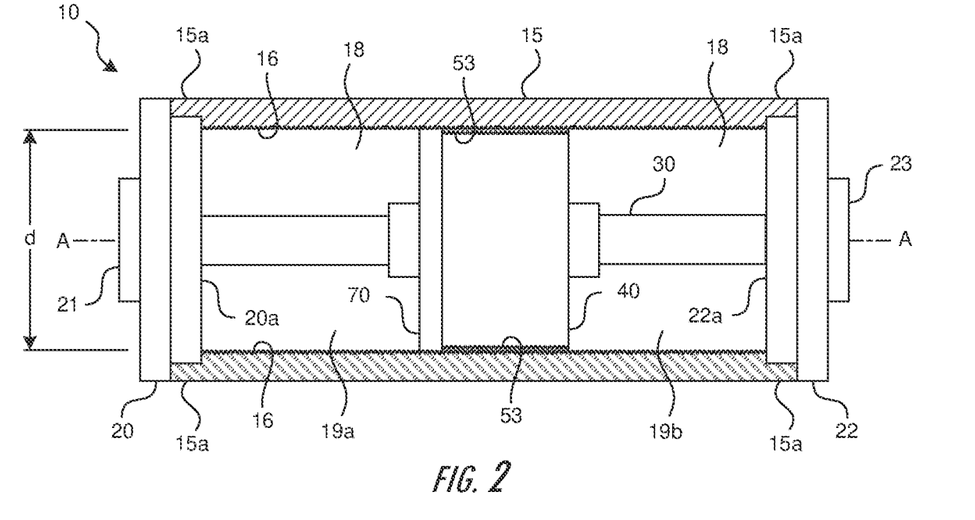
FIG. 2 is a view of the interior of the accumulator of FIG. 1 with half the outer shell removed.

As seen in FIGS. 1 and 2, an accumulator 10 includes a shell 13 that defines an interior volume 18. In the illustrated embodiment, the shell 13 includes a main body 15 and endplates 20 and 22, which are attached to the main body 15. Preferably, the main body 15 is a hollow cylinder. However the main body can have other shapes, such as, e.g., a rectangular shape. Preferably, the endplate 20 includes ports 25a, 25b to connect to a fluid system. Although two ports are shown in FIG. 1, in some embodiments, the accumulator 10 can include one port or more than two ports. In addition, the port or ports can be in the main body instead of the endplates 20, 22. Preferably, as seen in FIG. 2, each of the endplates 20, 22 has a threaded portion 20a, 22a, respectively, to receive sections 15a of the main body 15. Sections 15a have threads corresponding to threaded portions 20a, 22a such that the threaded interfaces between the main body 15 and each of the endplates 20, 22 forms a tight, secure connection. Of course, other means to attach the main body 15 to the endplates 20, 22 can be used such a bolted connection, a welded connection or some other known means that will secure the main body 15 to the endplates 20, 22. Although not shown, gaskets, O-rings or some other sealing means can be used at the interface between the main body 15 and endplates 20, 22 to ensure that fluid in the interior volume 18 of the shell 15 will not leak outside the accumulator 10. In high-pressure systems, a seal-weld on the exterior of the main body 15 at the interface to endplate 20 can be used to ensure that the accumulator is properly sealed. In some embodiments, the interface at endplate 22 need not be sealed or need to have a tight seal because the chamber 19b will remain unpressurized. In some embodiments, the main body 15 and one of the endplates 20, 22 can form one integral unit. For example, the main body 15 and endplate 20 can be machined or forged as a single piece. Of course, although endplates 20, 22 are shown as disks, the endplate can be any appropriate shape such as, e.g., a dome.

An accumulator shaft 30 is disposed in the interior volume 18 of the main body 15 along the longitudinal axis A-A of the accumulator 10. In the exemplary embodiment, axis A-A is the central axis. Preferably, the accumulator shaft 30 is attached to one interior surface of the shell 13 and extends at least partially across the interior volume 18 along the longitudinal central axis A-A. In some embodiments, the accumulator shaft 30 extends the full length of the interior volume 18. Preferably, the accumulator shaft 30 is fixedly attached to each endplate 20, 22. For example, the accumulator shaft 30 can be attached to the endplates 20, 22 using endplate covers 21, 23, respectively. Bolts, screws or other known fastening means can be used to attach the accumulator shaft 30 to the endplate covers 21, 23. The endplate covers 21, 23 can also to serve to seal the interior volume 18 from the outside. Although not shown, gaskets, O-rings or other known sealing means can be used between the endplate covers 21, 23 and the respective endplate 20, 22 to provide the sealing. Of course, the accumulator shaft 30 can be attached to the one or both of the endplates 20, 22 using other means of attachment such as a threaded connection. In some embodiments, the accumulator shaft 30 does not penetrate or only partially penetrates into one or both of the endplates 20, 22. In such cases, the endplate covers 21, 23 may not be needed.

A piston-plate 70 is disposed on the accumulator shaft 30 such that the piston-plate 70 travels along the accumulator shaft 30. The piston-plate 70 separates the interior volume 18 into two chambers 19a, 19b. The piston-plate 70 can be made of any appropriate material for the fluid application. For example, in hydraulic fluid the piston-plate can be made of a metal such as, e.g., steel and alloys thereof and aluminum and alloys thereof, to name just a few. In other applications, e.g., applications that include reactive chemicals, the piston-plate 70 can be coated with an appropriate non-reactive material and/or made of, e.g., a plastic or a ceramic, to name just a few. In the exemplary embodiment of FIG. 2, a motor 40, which has a central passageway 32 (see FIG. 3), is disposed on the accumulator shaft 30 between the piston-plate 70 and an inner surface of the shell 13, e.g., endplate 22. The motor 40 is coupled to the piston-plate 70 such that rotational movement of the motor 40 translates to a corresponding linear movement of the piston-plate 70 along the central axis A-A.

As seen in FIG. 2, the piston-plate 70, with motor 40, acts similar to a piston found in traditional piston-type accumulators. However, while the piston-plate 70 acts similar to a traditional piston, those skilled in the art, after reading the present specification, will understand exemplary embodiments of the present disclosure provide advantages not found in traditional piston-type accumulators. For example, in exemplary embodiments of the present disclosure, the motor 40 removes the need for an energy storage device such as a diaphragm or a bladder with compressed gas, which eliminates maintenance issues related to the diaphragm or bladder. In addition, the motor 40 only exerts pressure on the fluid system when the system is in operation. Thus, because the pressure will be removed after operation, the accumulator 10 and the system will not constantly be under pressure. Accordingly, the accumulator 10 and equipment can be lighter (e.g., due to the accumulator having thinner walls) and still maintain a comfortable safety factor. In addition, because an "intelligent" control system can be configured to control motor 40 of accumulator 10, changes in the system conditions such as pressure, volume flow, response times or some other change due to, e.g., upgrades to equipment or for some other reason can be easily accounted for by adjustment to, e.g., the algorithms that control motor 40. Further, unlike the prior art accumulators that are configured for specific applications, the same accumulator configuration can be used in a variety of applications with only the control philosophy for motor 40 being application specific. This is possible because the controller can be easily reprogrammed with customized algorithms for the various applications.

Figures 3, 4A, 4B:
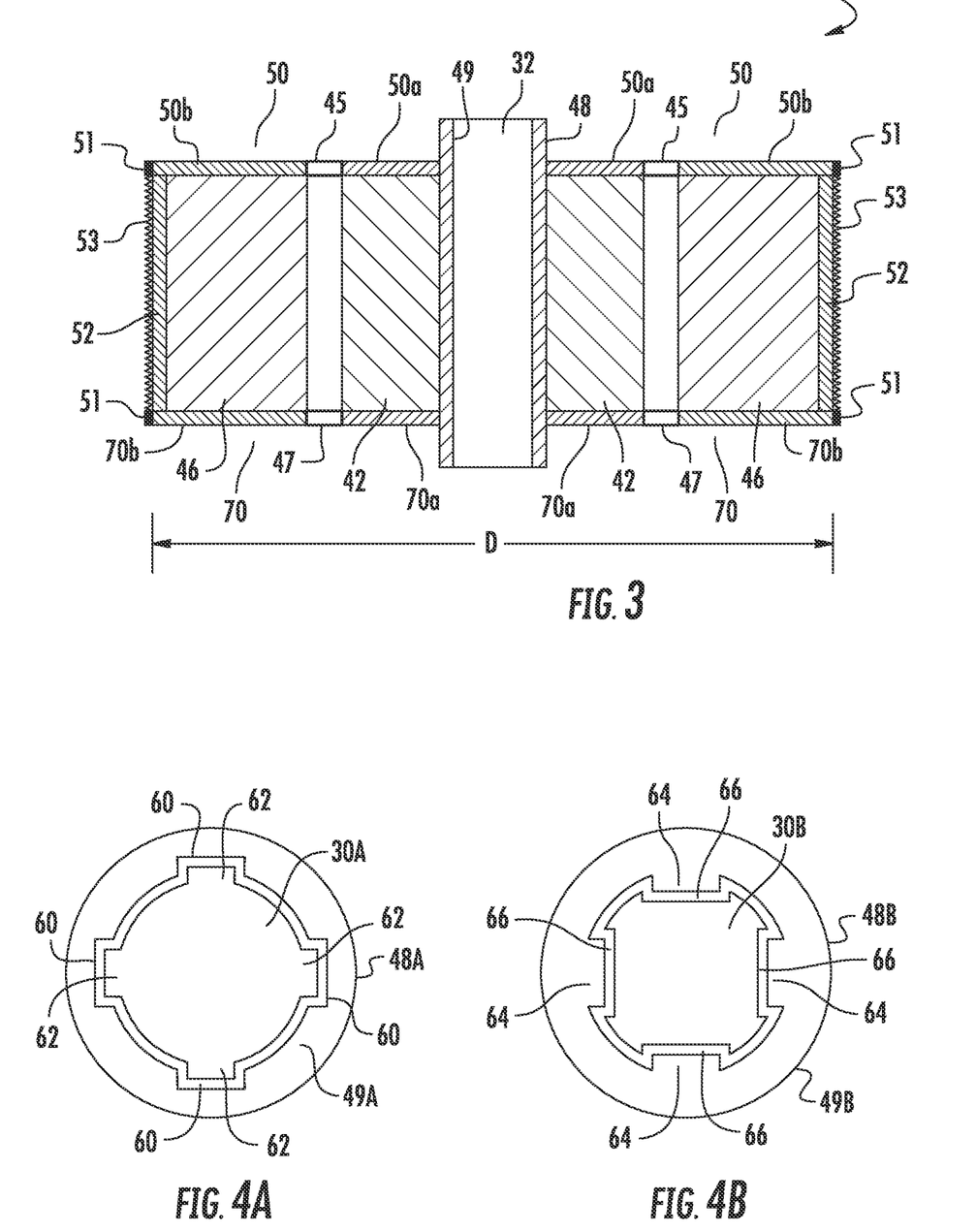
FIG. 3 is a cross-sectional view of an exemplary embodiment of a motor that can be used in the accumulator of FIG. 1.
FIGS. 4A and 4B are cross-sectional views of exemplary embodiments of interlocking arrangements between the motor shaft and the accumulator shaft, and 4C and 4D are cross-sectional views of exemplary embodiments of interlocking arrangements between the motor casing and/or piston plate and the accumulator shell.
Figure 7A:
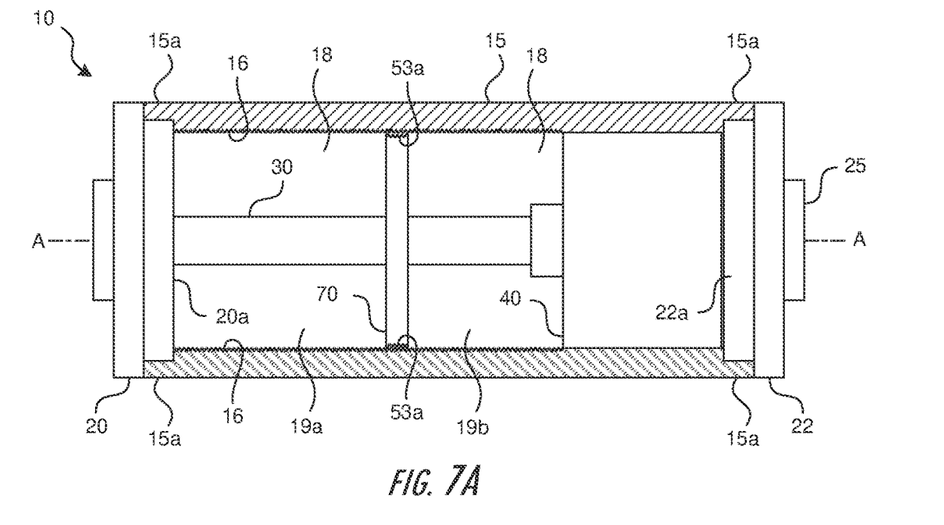
FIG. 7A is an interior view of an accumulator in which the motor and piston-plate are separated.
Figure 7B:
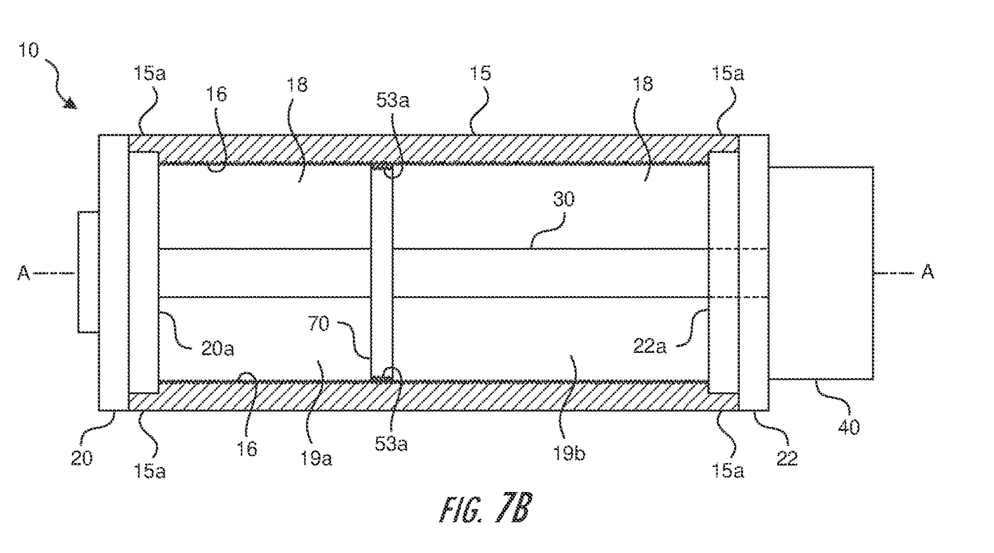
FIG. 7B is an interior view of an accumulator in which the motor is disposed outside the accumulator.

As discussed above, motor 40 is configured such that rotational movement of the motor 40 translates to a corresponding linear movement of the piston-plate 70 along the accumulator shaft 30. Preferably, the piston-plate 70 is directly coupled to motor 40 and is, e.g., a part of the casing (or housing) for motor 70. Preferably, the central passageway 32, which is disposed along, e.g., the central axis of the motor 40, receives the accumulator shaft 30 such that the motor 40 and piston-plate 70 travel along the accumulator shaft 30. Preferably, as seen in FIG. 3 and explained further below, the piston-plate 70 is a part of the casing of the motor 40. The motor 40 is coupled to the accumulator shaft 30 and rotates the accumulator shaft 30 to linearly move piston-plate 70. Of course, other coupling arrangements between the motor 40 and piston-plate 70 can be used so long as rotational movement of the motor 40 translates to linear movement of the piston-plate 70. In some exemplary embodiments, for example as seen in FIGS. 7A and 7B, the piston-plate 70 and the motor 40 can be separate devices that are coupled together via the accumulator shaft 30 or through some other means, and respectively include a threaded interface between the threads 16 on the interior of shell 13 and threads 53a on the exterior of the piston-plate 70. In such exemplary embodiments where the piston-plate 70 is not a part of motor 40, the motor 40 need not move linearly with the piston-plate 70. For example, as seen in FIG. 7A, the motor 40 can be disposed in an appropriate location such as, e.g., at endplate 22 (or at endplate 20—not shown), or as seen in FIG. 7B, the motor 40 can be disposed outside the shell 13. The motor 40 in the exemplary embodiments of FIGS. 7A and 7B can remain fixed or stationary.

Returning to the exemplary embodiment of FIGS. 2 and 3, preferably, the motor 40 includes a motor casing 50 that surrounds and protects the stator 42 and rotor 46. In some embodiments, the casing 50 has inner motor casings 50a and 70a, outer motor casings 50b and 70b and outer radial casing 50c. The outer motor casings 50b and 70b and outer radial casing 50c can be an integral unit in some embodiments. Preferably, the inner motor casing 70a and the outer motor casing 70b, along with bearing 47, form the piston-plate 70. Of course, other arrangements can be used to form piston-plate 70. For example, the piston-plate 70 can be a separate disk that is disposed adjacent to the motor casing 50 and coupled to either the inner motor casing 70a or the outer motor casing 70b.

Preferably, the motor 40 has an outer-rotor configuration, which means that the outside of the motor rotates and the center of the motor is stationary. In contrast, in an inner-rotor motor configuration, the rotor is attached to a central motor shaft that rotates. As seen in FIG. 3, the stator 42 is radially disposed between the motor shaft 48 and the rotor 46. The motor shaft 48 is hollow and the interior wall 49 of the motor shaft 48 defines the central passageway 32. The rotor 46 is disposed radially outward of the stator 42 and surrounds the stator 42. The rotor 46 is coupled to the stator 42 via bearings 45, 47 such that the rotor 46 can freely rotate around stator 42. For example, in FIG. 3, the stator 42 is fixedly attached to inner motor casings 50a and 70a which are coupled to bearings 45 and 47 respectively. The rotor 46 is fixedly attached to the outer motor casings 50b and 70b, which are coupled to bearings 45 and 47, and outer radial casing 50c. The outer motor casings 50b and 70b and outer radial casing 50c are fixedly attached to the rotor 46 such that the outer motor casings 50b and 70b and outer radial casing 50c rotate with the rotor 46. Although the bearings 45 and 47 are shown attached to the motor casing 50, in other embodiments, the bearings can directly connect the stator portion to the rotor portion.

Preferably, the diameter D of piston-plate 70, which includes the motor casings 70a and 70b, is substantially the same as the interior diameter d of the shell 13 (see FIG. 2). In the exemplary embodiment of Figure, because the piston-plate 70 is part of the motor, the diameter D of the motor 40 will also be substantially the same as the interior diameter d of the shell 13. Preferably, the diameter D of the motor 40 and thus the piston-plate 70 is in a range of 4 inches to 12 inches. Preferably, the outer radial motor casing 50c includes a threaded portion 53 along at least a portion of the outer radial surface 52 of the outer radial motor casing 50c. In some embodiments, the threaded portion can be the full-length of the outer radial surface 52, including the outer radial surface of the piston-plate 70. In other exemplary embodiments, only the outer radial surface of the piston-plate 70 is threaded. The threaded portion 53 engages with matching threads 16 disposed on the interior of shell 13. Preferably, the thread pitch is very fine such that a full rotation of the motor 40 translates to only a small linear movement along the accumulator shaft 30. For example, the thread pitch can be in a range from 1.5 mm to 2.00 mm. In some embodiments, the thread size is M80. When assembled, the interface between the threaded portions of the motor 40 and/or piston-plate 70 and the shell 13 have a small tolerance such that it forms a seal to prevent or substantially prevent fluid from passing between the motor 40/piston-plate 70 and shell 13. However, the tolerances are not so tight as to interfere with the rotational movement of the motor 40/piston-plate 70.

Preferably, the motor 40 is bidirectional, i.e., the motor can rotate in either direction depending on operational needs. In some embodiments, the motor 40 is a low-speed, high-torque motor. For example, the motor can be a transverse flux motor that provides high torque density, e.g., such as that disclosed in International Patent Application Publication No. WO 2014/107,474, which is incorporated herein by reference in its entirety as background. In some exemplary embodiments, the motor 40 can be a variable speed and/or a variable torque motor in which the speed of the rotor is varied to create various volume flows and pressures. In some embodiments, the motor is a fixed-speed motor. In some embodiments, the motor is a low-speed, high-torque motor. Whether fixed-speed or variable speed, preferably, the motor operates in a range of 100 revolutions per minute (rpm) to 600 rpm. Preferably, in some embodiments the motor 40 is fixed-speed and approximately 150 rpm. In other embodiments, the speed is approximately 350 rpm and in still other embodiments, the speed is approximately 400. Whether fixed speed or variable, preferably, the motor has a torque in a range of 40 N-m to 130 N-m. In some embodiments, the torque is 120 N-m at 350 rpm and in other embodiments, the torque is 50 N-m at 400 rpm. Preferably, a diameter of the motor 40 is in a range of 4 inches to 12 inches, and a length of the motor 40 is in a range of 4 inches to 6 inches. In some embodiments, any of the motors described above can be configured as a servomotor to allow for precise control of the position and/or speed of the motor 40. Precision control of servomotors is known in the art and thus for brevity, will not be further discussed except as necessary to describe the exemplary embodiments of the present disclosure.

Preferably, the interior wall 49 of motor shaft 48 includes indents and/or protrusions that engage with corresponding protrusions/indents in the accumulator shaft 30 such that an interlocking arrangement is formed to prevent the shaft 48 and thus the stator 42 from rotating relative to the accumulator shaft 30. That is, in this exemplary embodiment, the stator 42 is fixed to the accumulator shaft 30 in the rotational direction. However, the motor 40/piston-plate 70 is free to linearly travel along the accumulator shaft 30 in the longitudinal direction. For example, FIG. 4A illustrates a cross-sectional view of an interface between an exemplary motor shaft 48A and an exemplary accumulator shaft 30A. As seen in FIG. 4A, the interior wall 49A of motor shaft 48A has indents 60 in the form of, e.g., grooves. The indents 60 are spaced periodically around the surface of the wall 49A and extend the entire length of the motor shaft 48A. The exterior surface of accumulator shaft 30A has protrusions 62 that correspond to the indents 60 on the motor shaft 48A. As illustrated in FIG. 4A, the protrusions 62 can be in the form of, e.g., fins. The protrusions 62 engage with indents 60 on the motor shaft 48A to from an interlocking arrangement to prevent the stator 42 from rotating relative to the accumulator shaft 30A.

In some embodiments, as seen in FIG. 4B, the interior wall 49B of motor shaft 48B has protrusions 64 in the form of, e.g., fins. The protrusions are spaced periodically around the surface of the wall 49B and can extend the entire length or a portion of the length of the motor shaft 48B. The exterior surface of accumulator shaft 30B has indents 66, e.g., grooves, that correspond to the protrusions 64 of the motor shaft 48A. The indents 66 can extend the entire length of the accumulator shaft 30B or at least the portion that the motor 40 needs to travel. The indents 66 engage with protrusions 64 on the motor shaft 48B to from an interlocking arrangement to prevent the stator 42 from rotating relative to the accumulator shaft 30B. In some embodiments, the motor shaft and the accumulator shaft have a mixture of corresponding indents and protrusions.

Figure 5A:
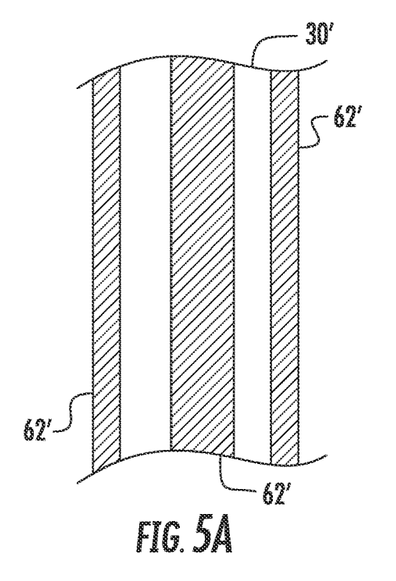
FIGS. 5A and 5B are front views of exemplary configurations of accumulator shafts.
Figure 5B:
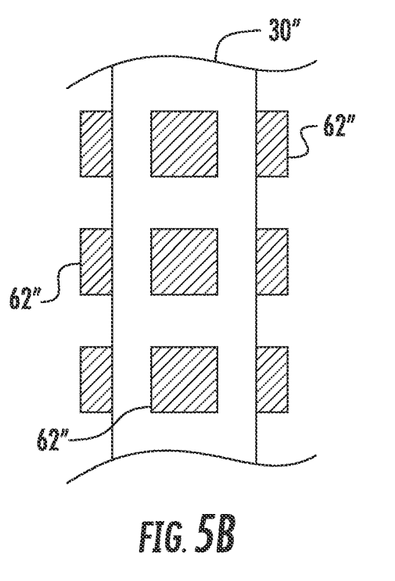

In some embodiments, the protrusions on the motor shaft 48 and accumulator shaft 30 run the entire length or only a part of the length of the respective shafts without any breaks. For example, as shown in FIG. 5A, the protrusions 62' on accumulator shaft 30' run the entire length or nearly the entire length of the accumulator shaft 60'. In some embodiments, the protrusions can be segmented along the length of the shaft. For example, in FIG. 5B, the protrusions 62" are in segments along the length of the accumulator shaft 30". Of course, if the motor shaft 48 has the protrusions, then they can be similarly arranged on the interior of the motor shaft in a manner analogous to that shown in FIGS. 5A and 5B. The size, number and shape of the indents/protrusions in the above embodiments can vary so long as the motor 40 can slide along the accumulator shaft and the shafts form an interlocking arrangement to prevent rotational movement between the two shafts. Of course, the size, number and shape of the indents/protrusions should also be such that the interlocking arrangement and/or the shafts can withstand the rotational stresses of the motor 40.

In some embodiments, the length of interior volume 18 is equal to or greater than the width or diameter of the interior volume 18. In other embodiments the length of interior volume 18 is less than the width or diameter of the interior volume 18. Preferably, a length to width (diameter) ratio of the interior volume 18 of the accumulator 10 is in a range of 0.8 to 9. Preferably, the interior volume has a length in a range of 12 inches to 36 inches and a diameter in a range of 4 inches to 15 inches. Preferably, the maximum volume capacity of chamber 19a of the accumulator 10 is in a range of 2 gallons to 6 gallons. Preferably, the diameter of the accumulator shaft 30 is in a range of 0.5 inches to 2 inches. Of course, the above dimensions of the accumulator 10 are exemplary and can vary from the above ranges depending on the application.

As discussed above, the motor 40/piston-plate 70 separates the interior volume 18 into two chambers 19a, 19b. Chamber 19a is in fluid communication with ports 25a and 25b. When the accumulator 10 is installed in a fluid system (e.g., see FIG. 6), the chamber 19a is in fluid communication with the fluid system via ports 25a and 25b. Chamber 19b is isolated from the fluid system by the motor 40/piston-plate 70. As discussed above, tight tolerances between the motor shaft 48 and accumulator shaft 30 and between the motor threads 53 (and/or threads of piston-plate 70) and shell threads 16 provide a sufficient seal so that fluid, e.g., hydraulic fluid, does not leak into chamber 19b. However, chamber 19b can include a drain (not shown) to carry away any fluid that enters chamber 19b. In some embodiments, the outer circumference of the outer radial casing 50c and/or piston-plate 70 can include a sealing ring strip 51 made of a material such as, e.g., Teflon, polyurethane, nitrile rubber, fluoroelastomer-viton, EPDM rubber, silicon rubber, proprietary filled TFE, aluminum and bronze, that slides or rotates against the shell 13 (depending on the type of interface) to help seal the threads and prevent fluid from entering the chamber 19b, i.e., to keep the fluid contained in chamber 19a. Preferably, a sealing ring strip 51 is disposed on at least the side adjacent to chamber 19a. The sealing ring strip 51 can be attached to the motor casing 50 using known means such that the ring strip is secure during operation. Preferably, as seen in FIG. 3, a sealing ring strip 51 is disposed on both sides of the motor 40. Including a sealing ring strip 51 on the side adjacent to chamber 19b aids in preventing air, dirt and other contaminates from entering chamber 19a and the hydraulic fluid as the motor 40 travels along accumulator shaft 30. In addition, motor shaft 48 and/or accumulator shaft 30 can be coated with a material such as, e.g., Teflon, silicon and ceramic, to help seal the shaft area to prevent fluid from entering the chamber 19b, i.e., to keep the fluid contained in chamber 19a, to help in keeping air, dirt and other contaminants from entering the chamber 19a, and to help minimize the sliding friction between the motor shaft 48 and the accumulator shaft 30. In some embodiments all or part of the motor shaft 48 can be made of a material such as, e.g., Teflon, polyurethane, nitrile rubber, fluoroelastomer-viton, EPDM rubber, silicon rubber, proprietary filled TFE, aluminum and bronze to help seal the shaft and minimize the sliding friction.

Unlike traditional accumulators, in some embodiments of the present disclosure, the chamber 19b of the accumulator 10 does not have stored energy. That is, the chamber 19b does not include compressed gas, a spring or another energy storage device. Instead, when it is determined that the fluid system needs additional energy, i.e., needs additional fluid, the motor 40 moves the piston-plate 70 to increase the pressure in the system by decreasing the volume of chamber 19a. Conversely, when it is determined that the fluid system needs less energy, i.e., the accumulator needs to receive excess fluid from the system, the motor 40 moves the piston-plate 70 to decrease the pressure in the system by increasing the volume of chamber 19a. In exemplary embodiments of the disclosure, the accumulator 10 can provide pressures in the range of 1000 psi to 5000 psi and maximum flow rates in a range of 0.25 gpm to 6 gpm, depending on the application. In addition, depending on the application, the volume of the accumulator can be in a range from 0.125 gallon to 12 gallons. Because the motor 40 controls the volume of chamber 19a to provide fluid to or releases fluid from the system as needed, stored energy, e.g., in the form of compressed gas and springs are not needed in some embodiments. In some exemplary embodiments, however, chamber 19b can have a stored energy, e.g., compressed gas in a bladder or diaphragm, a spring or another sorted energy device in order to aid the motor 40 when it is overcoming the system pressure in providing fluid to the system. Such a configuration can help in limiting the size of the motor in very high-pressure systems while retaining some of the advantages of a motor-operated accumulator.

Figure 4C:
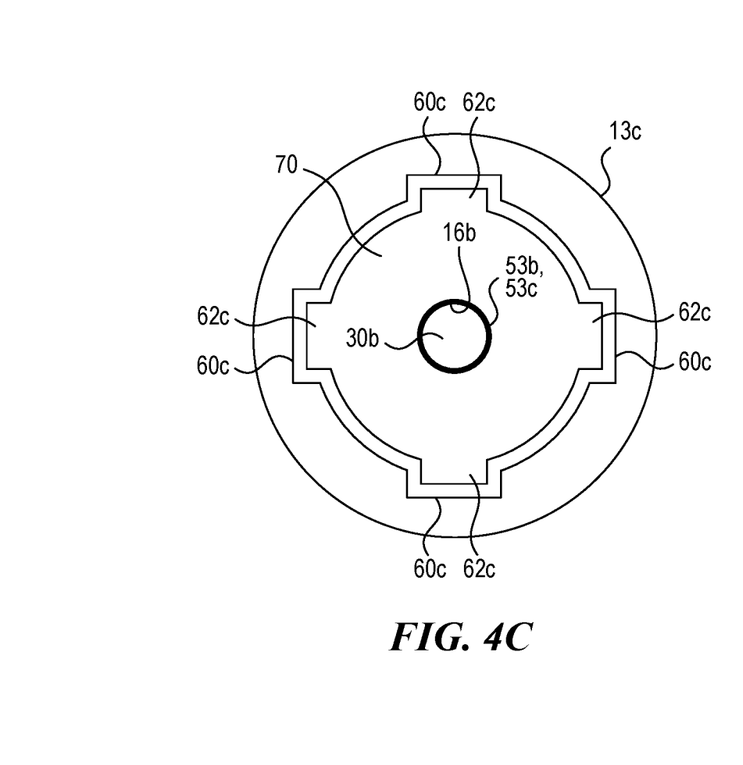
Figure 4D:
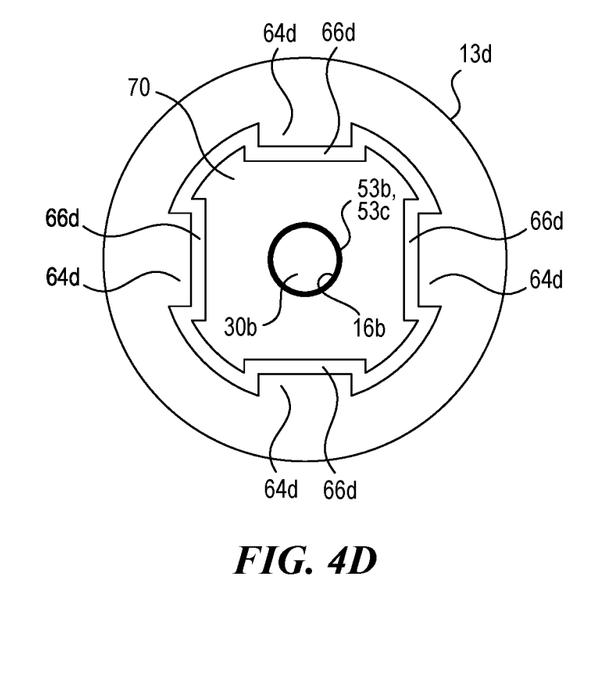
Figure 8A:
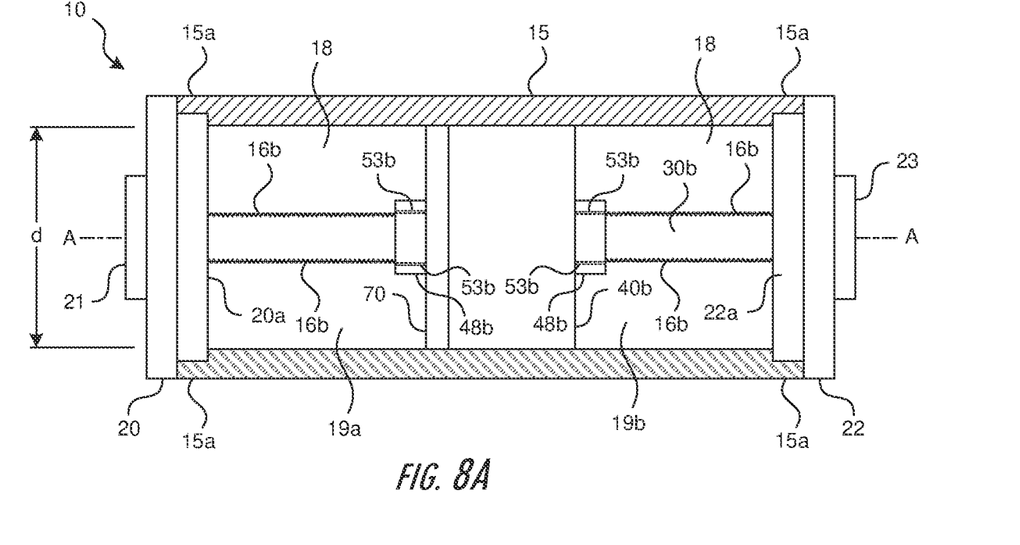
FIGS. 8A and 8B show exemplary embodiments of interior views of the accumulator of FIG. 1 having a threaded interface between the motor shaft and accumulator shaft and a threaded interface between a central hub of a piston plate and accumulator shaft, respectively.

In the above exemplary embodiments, the motor 40 has an outer-rotor configuration with a threaded interface between the motor and shell. However, in other exemplary embodiments, for example, as seen in FIG. 8A, the motor 40b can have an inner-rotor configuration and the motor shaft can be threaded. For example, in FIG. 8A, the threads 53b on the motor shaft 48b interface to matching threads 16b on the accumulator shaft 30b, which is fixedly attached to the shell. In this embodiment, as the motor 40b rotates, the motor casing and piston-plate 70 are configured to slide along the interface with the shell 13. Similar to the motor shaft 48 and accumulator shaft 30 discussed above, as seen in FIG. 4C, the motor casing and/or piston-plate 70 can have protrusions 62c that interface with corresponding indents 60c on the accumulator shell 13c to achieve the sliding interface, and as seen in FIG. 4D, the motor casing and/or piston-plate 70 can have indents 66d that interface with corresponding protrusions 64d on the accumulator shell 13d to achieve the sliding interface. The piston-plate/motor casing-shell interface provides an interlock to prevent rotational movement of the motor casing relative to the shell. However, the interface still allows for linear movement in the longitudinal direction of the accumulator. Thus, when the motor rotates, the motor and piston-plate will travel along the accumulator shaft in both directions, depending on the direction of rotation of the motor.

Figure 8B:
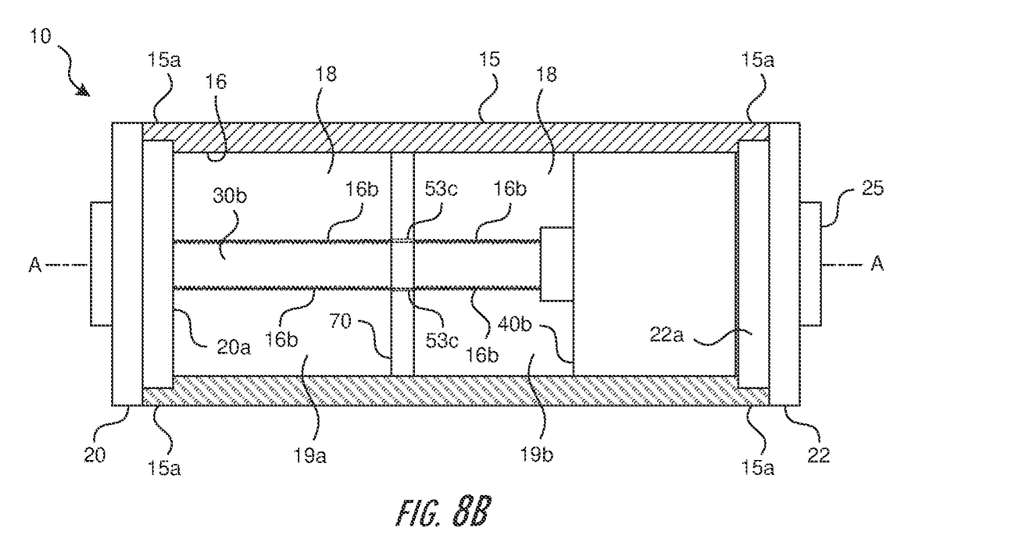

In still other embodiments, the shaft of an inner-rotor motor is coupled to the accumulator shaft, which is threaded. Unlike the above embodiments, the accumulator shaft is disposed such that the accumulator shaft can rotate. The motor can be disposed outside the accumulator or even inside the accumulator. If inside the accumulator, the motor can be in either chamber of the accumulator and, in some embodiments, can act as an endplate. In exemplary embodiments, for example, as seen in FIG. 8B, the threaded accumulator shaft 30b with threads 16b can receive a piston-plate 70 that is separate from the motor 40b. As seen in FIG. 8B, the piston-plate 70 includes a hub that has corresponding threads 53c to interface with threads 16b of the threaded shaft 30b. The outer circumference of the piston-plate, i.e., the interface to the shell, is configured to slide along the shell. Similar to the embodiments discussed above, the outer circumference of the piston-plate can have indents and/or protrusion that interface with corresponding protrusions and/or indents on the accumulator shell. The piston-plate-shell interface provides an interlock to prevent rotational movement of the piston-plate relative to the shell. However, the interface still allows for linear movement of the piston-plate in the longitudinal direction of the accumulator. Thus, when the motor rotates the accumulator shaft, the piston will travel along the accumulator shaft in both directions, depending on the direction of rotation of the motor. Of course, other coupling arrangements can be used between the motor and piston-plate so long as rotation of the motor translates to a corresponding linear movement of the piston-plate along the central axis A-A.

In the above embodiments, motor 40 is described as an electric motor. However, the motor can be another type of motor such as, e.g., a hydraulic motor or another type of fluid-driven motor.

Figure 6:
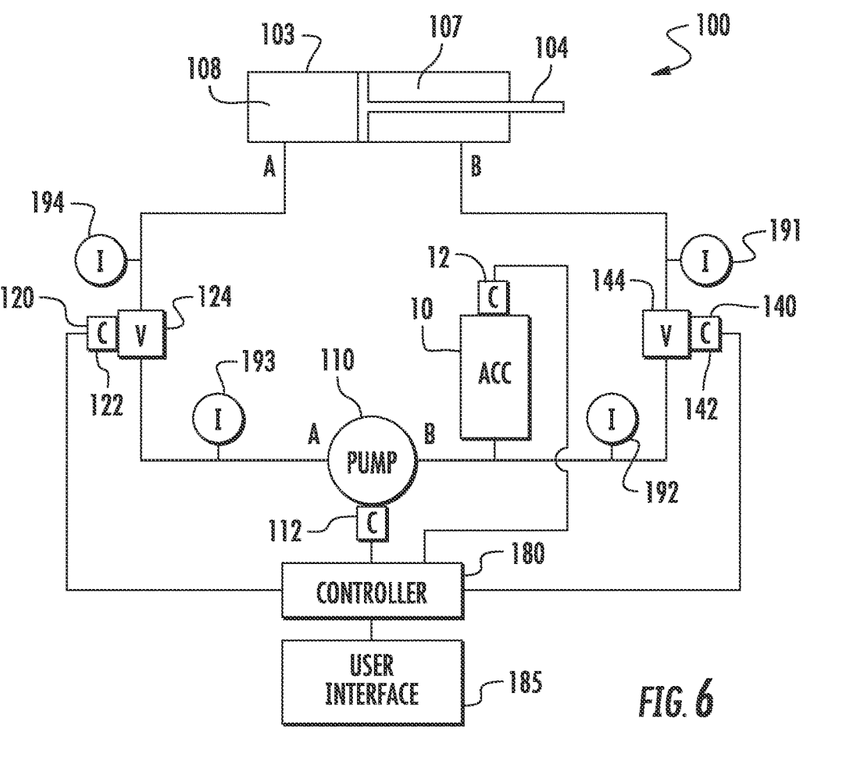
FIG. 6 is a schematic view of an exemplary hydraulic system using the accumulator of FIG. 1.

FIG. 6 illustrates an exemplary embodiment of a fluid system. For purposes of brevity, the fluid system will be described in terms of an exemplary closed-loop hydraulic system application. However, those skilled in the art will understand that the concepts and features described below are also applicable to systems that pump other (non-hydraulic) types of fluids and/or to open-loop systems.

The hydraulic system 100 includes a hydraulic pump 110 providing hydraulic fluid to a hydraulic actuator, which is hydraulic cylinder 103 in this embodiment. However, those skilled in the art will understand that the actuator can be a hydraulic motor or another type of fluid-driven actuator that performs work on an external load. The hydraulic system 100 also includes valve assemblies 120 and 140, which can be proportional control valves, lock valves or another type of valve appropriate for the intended application. In some embodiments, the system 100 can be configured to include only one of the valve assemblies 120 and 140. The hydraulic system 100 can include a motor-driven accumulator 10, which can be any of the exemplary embodiments discussed above. A controller 180 controls the flow and/or pressure in the system. A user can control the system via user interface 185. The valve assembly 140 is disposed between port B of the hydraulic pump 110 and port B of the hydraulic cylinder 103, i.e., the valve assembly 140 is in fluid communication with port B of the hydraulic pump 110 and port B of the hydraulic cylinder 103. The valve assembly 120 is disposed between port A of the hydraulic pump 110 and port A of the hydraulic cylinder 103, i.e., the control valve assembly 120 is in fluid communication with port A of the hydraulic pump 10 and port A of the hydraulic cylinder 103. The accumulator 10 is connected to the system 100 between the port B of the pump 110 and valve assembly 140. However, in some embodiments, the accumulator 10 can also be located between port A of the pump 110 and valve assembly 120 or in another appropriate location in the system 100.

In some embodiments, the system can have two or more accumulators depending on the needs of the system. The system 100 can also have instrumentation sensors located throughout the system. For example, as shown in FIG. 6, sensor assemblies 191-194 are located before and after each valve assembly 120, 140. However, the sensor assemblies are not limited to these locations and other locations can be used. Each of the sensor assemblies 191-194 can have a flow sensor, a temperature sensor and/or a pressure sensor.

In some exemplary embodiments, the pump 110 is a variable speed, variable torque pump. In other embodiments, the hydraulic pump 110 is a fixed-speed pump. In some embodiments, the hydraulic pump 110 is bi-directional. The pump 110 can include a pump control circuit 112, which can include the drive control for the prime mover of the pump, e.g., electric motor, a hydraulic motor or another type of motor depending on the type of pump. The pump 110 is controlled by the controller 180 via the pump control circuit 112. In some embodiments, the controller 180 is configured to control the speed and/or torque of the pump 110 in order to control the flow and/or pressure in the system 100.

The exemplary embodiment of FIG. 6 includes two valve assemblies 120, 140. Each valve assembly 120, 140 includes a valve 124, 144, respectively. The valves 124, 144 can be control valves, shut-off valves or some other type of valve that is appropriate for the system application. The valve assemblies 120, 140 also include valve control circuits 122, 142, respectively, that are appropriate for the type of valve. For example, if the valves 120, 140 are control valves, the control circuits 122, 142 can operate the valves 124, 144 anywhere between 0% and 100% open. If the valves 120, 140 are shut-off valves, the control circuits 122, 142 can provide open and close command to the valves 124, 144. The valves 124, 144 are controlled by the controller 180 via valve control circuits 122, 144, respectively. In some embodiments, when the valves 124, 144 are control valves, the controller 180 is configured to control an opening of the valves 124, 144 in order to control the flow and/or pressure in the system 100. In some embodiments, the controller 180 will control the opening of the valves 124, 144 in order to control the flow and/or pressure in the system 100 while concurrently controlling the speed and/or torque of the pump 110 in order to control the flow and/or pressure in the system 100.

The accumulator 10 can be configured as any one of the exemplary embodiments of a motor-driven accumulator as discussed above. The accumulator 10 is controlled by accumulator control circuit 12 which can include the drive control for the prime mover of the accumulator, e.g., electric motor, hydraulic motor or another type of fluid driven motor. The controller 180 controls the operation of the accumulator via the accumulator control circuit 12.

A common power supply (not shown) can provide power to the controller 180, control valve assemblies 120, 140, the hydraulic pump 110 accumulator 10 and/or sensor assemblies 191-194. In some embodiments, each component can have its own separate power supply.

Each of the control circuits 112, 122, 142 and 12 includes hardware and/or software that interprets the command signals from the controller 180 and sends the appropriate demand signals to the motor of pump 110, valve 124, valve 144 and the motor 40 of accumulator 10, respectively. For example, the pump control circuit 112 can include pump curves and/or motor curves (e.g., motor curves for an electric motor) that are specific to the hydraulic pump 110 such that command signals from the controller 180 will be converted to an appropriate speed/torque demand signals to the hydraulic pump 110 based on the configuration of the hydraulic pump 110. Similarly, the valve control circuits 122 and 142 can include valve curves and/or valve actuator curves that are specific to the valves 124, 144, respectively, and the command signals from the controller 180 will be converted to the appropriate demand signals based on the type of valve. The accumulator control circuit 12 can include motor curves (e.g., motor curves for an electric motor) and/or curves that are specific to the accumulator configuration, e.g., curves that take into account the dimensions, the pressure ratings, the flow ratings, thread pitch, outer-rotor or inner-rotor motor configuration, fixed accumulator shaft or rotating accumulator shaft, or other design criteria that are specific to the accumulator 10 or the application such that command signals from the controller 180 will be converted to an appropriate speed/torque demand signals to the motor of the accumulator 10. The above-discussed curves can be implemented in hardware and/or software, e.g., in the form of hardwire circuits, software algorithms and formulas, or a combination thereof.

In some embodiments, the controller 180 and/or the control circuits 112, 122, 142 and 12 can include application specific hardware circuits and/or software (e.g., algorithms or any other instruction or set of instructions to perform a desired operation) to control the motor of pump 110, the valves 124, 144 and/or the motor 40 of accumulator 10. For example, in some applications, the hydraulic cylinder 103 can be installed on a boom of an excavator. In such an exemplary system, the controller 180 can include circuits, algorithms, protocols (e.g., safety, operational), look-up tables, etc. that are specific to the operation of the boom. Thus, an input signal from an operator on the user interface 185 can be interpreted by the controller 180, which sends the appropriate command signals to the motor of the pump 110, the valves 124, 144 and/or the motor 40 of accumulator 10 to position the boom at a desired positon.

The controller 180 can receive feedback data from concerning the operation of the pump 110, the valves 124, 144 and the accumulator 10. For example, the controller 180 and/or the respective control circuits 112, 12 can receive motor data such as revolution per minute (rpm), speed, frequency, torque, current and voltage, and/or other data related to an operation of a motor from the pump 110 and/or the accumulator 10. In addition, if the motor 40 in the accumulator 10 is a servomotor, the controller 180 and/or the accumulator control circuit 12 can receive feedback on the exact positon of the motor 40 relative to the shell 13 of the accumulator 10. For example, based on the pulses from the servo motor 40, the rotational positon, i.e., the 0-360 deg. positon of the motor 40 and/or piston-plate 70 (depending on the configuration) relative to a reference point on the shell 13 can be calculated, and/or the longitudinal positon of the motor 40 and/or piston-plate 70 (depending on the configuration) along the longitudinal length of the shell 13 can be calculated, e.g., by counting the number of revolutions in comparison to the thread pitch.

In addition, the controller 180 and/or the control circuits 122, 142 can receive feedback data from the control valves 124, 144. For example, the controller 180 and/or the control circuits 122, 142 can receive the open and close status and/or the percent opening status of the valves 124, 144. In addition, depending on the type of valve actuator, the controller 180 and/or the control circuits 122, 142 can receive feedbacks such as speed and/or position of the actuator. Further, controller 180 and/or the control circuits 112, 122, 142 and 12 can receive feedback of process parameters such as pressure, temperature, flow, or other parameters related to the operation of the system 100. For example, each of the sensor assemblies 191-194 can measure process parameters such as pressure, temperature, and/or flow rate of the hydraulic fluid. The sensor assemblies 191-194 can communicate with controller 180 and/or control circuits 112, 122, 142 and 12 via wired or wireless communication connections. Alternatively, or in addition to sensor assemblies 191-194, the hydraulic system 100 can have other sensors throughout the system to measure process parameters such as, e.g., pressure, temperature, flow, and/or other parameters related to the operation of the system 100.

The communications between controller 180 and control circuits 112, 122, 142 and 12 can be digital based or analog based (or a combination thereof) and can be wired or wireless (or a combination thereof). In some embodiments, the control system can be a "fly-by-wire" operation in that the control and sensor signals between the controller 180 and control circuits 112, 122, 142 and 12 are entirely electronic or nearly all electronic. That is, in the case of hydraulic systems, the control system does not use hydraulic signal lines or hydraulic feedback lines for control, e.g., the valves 122, 142 do not have hydraulic connections for pilot valves. In some systems, a combination of electronic and hydraulic controls can be used.

The inventive accumulator in the above exemplary embodiments allows the controller 180 to precisely control when and how much energy to inject into or remove from the system 100. That is, unlike prior art accumulators that can only operate on a pressure differential between the system and the accumulator gas pressure, the exemplary embodiments of the present disclosure provide for an intelligent accumulator configuration that controls the distribution of flow and/or pressure as needed. Preferably, the controller 180 controls the magnitude, direction and/or duration of a pressure boost and/or a flow boost to and from the system by appropriately operating the motor 40 of accumulator 10. Operation of the inventive accumulator 10 in the exemplary system 100 is discussed below.

If the hydraulic cylinder 103 travels in a direction in which the piston rod 104 is extended, the system will need to additional fluid in the system because the fluid returned to the pump 110 from retraction chamber 107 is less that that need for extraction chamber 108. Accordingly, the pump 110 will lose pressure at its suction if the difference in the volume of fluid is not accounted for. In traditional systems, the stored energy in the form of compressed gas or a spring in the traditional accumulator will push stored fluid into the system due to the difference between the pressure in the accumulator and the pressure in the system. That is, the higher pressure in the traditional accumulator as compared to the system pressure will force the fluid to enter the system. However, in exemplary embodiments of the present disclosure, there is no stored energy. Instead, when the piston rod 104 is extending, the controller 180 will control the motor 40 of accumulator 10 such that the volume of chamber 19*a* decreases, e.g., by moving piston-plate 70, and fluid is forced out ports 25*a* and 25*b* into the suction of pump 110. For example, sensor assembly 192 can provide feedback of the pump suction pressure to controller 180. When the pressure drops below a predetermined value, the controller 180 will control the motor 40 to move piston-plate 70 to force the fluid stored in accumulator 10 into the system 100 to raise the pressure in the system to the operational setpoint. Of course, the controller 180 can be configured to also anticipate the need for more fluid in the system 100 and take appropriate action with respect to accumulator 10. For example, when the command to extract hydraulic cylinder 103 is given, the controller 180 can also send a command to motor 40 via accumulator control circuit 12 to move piston-plate 70 to force fluid into the system 100.

Conversely, if the hydraulic cylinder is retracted, fluid is sent to retraction chamber 107 and extracted from extraction chamber 108. Because the volume of the extraction chamber 108 is greater than that of retraction chamber 107 due to the piston rod 104, there will be excess fluid in the system, which will cause the pressure in the system to rise. When the pressure at sensor assemblies 191 or 192 increases above a predetermined value, the controller 108 will control motor 40 via accumulator control circuit 12 to move the piston-plate 70 such that chamber 19*a* in accumulator 10 is expanded. By expanding chamber 19*a*, fluid from the system 100 can enter the accumulator 10 for storage and maintain the system at the operational setpoint. Of course, the controller 180 can be configured to also anticipate the need for less fluid in the system 100 and take appropriate action with respect to accumulator 10. For example, when the command to retract hydraulic cylinder 103 is given, the controller 180 can also send a command to motor 40 via accumulator control circuit 12 to move piston-plate 70 such that fluid is forced into the accumulator 10 via ports 25*a* and 25*b*. Of course, the controller 180 can command motor 40 to move piston-plate 70 even if the hydraulic cylinder 103 has not moved. For example, the controller 180 can sense the pressures, temperatures and flows in the system from sensor assemblies 191-194 and take appropriate adjustments to the positon of piston-plate 70 to reduce or eliminate pressure and/or flow disturbances in the system 100.

In either direction of operation, i.e., injecting fluid into the system piping or extracting fluid into chamber 19*a*, the motor 40 can be operated to move piston-plate 70 such that the pressure boost and/or flow boost is precisely controlled in order to minimize shocks and/or erratic system operation. For example, when injecting fluid into or extracting fluid from the system piping, the controller 180 can operate motor 40 to move piston-plate 70 so as to produce a slow flow rate to, e.g., minimize any shock or erratic behavior in the system. Alternatively, if a slow flow will lead to a shock or erratic behavior in the system, the controller 180 can operate the motor 40 to move piston-plate 70 so as to produce a fast flow rate. If the change in pressure or flow is temporary or within acceptable upper and lower limits, the controller 180 can take no action with respect to moving piston-plate 70 to prevent erratic operation.

In some embodiments, the controller 180 can control the piston-plate 70 to cancel any pressure waves that could shock and/or damage the system 100. For example, if the hydraulic cylinder 103 controls a boom of an excavator that suddenly hits a rock, the pressure shock wave could damage equipment in the system such as the pump 110 and the valves 120, 140. To prevent such damage, sensors in the system 100 can inform the controller 180 that the boom has stopped abruptly at which point the controller 180 can operate motor 40 to move piston-plate 70 to induce an "inverse" pressure wave into the system piping to cancel the pressure wave caused by the rock. Of course, the pressure wave cancellation feature is not only for sudden abnormal events. Pressure waves created in normal operation can also be cancelled to provide smoother, more efficient operation. For example, any pressure waves due to the operation pump 110 and valves 120, 140 can be cancelled to provide smoother operation by appropriately controlling motor 40. Thus, unlike prior art accumulators, embodiments of the present disclosure provide for an "intelligent" accumulator that can be controlled to eliminate or minimize problems due to pressure and/or flow disturbances in the system.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An accumulator for storing fluid, comprising:
   a shell that defines an interior volume;
   an accumulator shaft extending at least partially across the interior volume from a first interior surface of the shell;
   a piston-plate disposed in the interior volume such that the piston-plate and a second interior surface of the shell define a chamber in the interior volume, the chamber configured to be in fluid communication with a fluid system during operation of the piston-plate; and
   a motor coupled to the piston-plate,
   wherein an interface between the shell and at least one of the motor or piston-plate is a threaded interface and allows the piston-plate to linearly travel along the shell.

2. The accumulator of claim 1, wherein the motor includes a shaft and an interface between the motor shaft and the accumulator shaft prevents rotation movement of the motor shaft relative to the accumulator shaft.

3. The accumulator of claim 1, wherein the motor is disposed in the interior volume between the first interior surface of the shell and the piston-plate.

4. The accumulator of claim 1, wherein the threaded interface between the shell and the at least one of the motor or the piston-plate has a thread pitch that is in a range from 1.5 mm to 2.00 mm.

5. The accumulator of claim 1, wherein the piston-plate is part of an outer casing of the motor.

6. The accumulator of claim 1, wherein the piston-plate is disposed separately from the motor.

7. The accumulator of claim 1, wherein the fluid system is hydraulic fluid system.

8. The accumulator of claim 1, wherein the motor is a transverse flux motor.

9. An accumulator for storing fluid, comprising:
a shell that defines an interior volume;
an accumulator shaft extending at least partially across the interior volume from a first interior surface of the shell;
a piston-plate disposed in the interior volume such that the piston-plate and a second interior surface of the shell define a chamber in the interior volume, the chamber configured to be in fluid communication with a fluid system during operation of the piston-plate; and
a motor having a shaft and a rotor, the motor coupled to the piston-plate,
wherein an interface between the motor shaft and the accumulator shaft is a threaded interface and a rotational movement of the motor rotor translates to a linear movement of the piston-plate,
wherein an interface between the shell and at least one of the motor or piston-plate is a sliding interface, and
wherein the piston-plate is part of an outer casing of the motor.

10. An accumulator for storing fluid, comprising:
a shell that defines an interior volume;
an accumulator shaft extending at least partially across the interior volume from a first interior surface of the shell;
a piston-plate disposed in the interior volume such that the piston-plate and a second interior surface of the shell define a chamber in the interior volume, the chamber configured to be in fluid communication with a fluid system during operation of the piston-plate; and
a motor having a shaft and a rotor, the motor coupled to the piston-plate,
wherein an interface between the motor shaft and the accumulator shaft is a threaded interface and a rotational movement of the motor rotor translates to a linear movement of the piston-plate,
wherein an interface between the shell and at least one of the motor or piston-plate is a sliding interface, and
wherein the sliding interface prevents rotational movement of a casing of the motor relative to the shell.

11. The accumulator of claim 10, wherein the motor is disposed in the interior volume between the first interior surface of the shell and the piston-plate.

12. The accumulator of claim 10, wherein the threaded interface between the motor shaft and the accumulator shaft has a thread pitch that is in a range from 1.5 mm to 2.00 mm.

13. The accumulator of claim 10, wherein the piston-plate is disposed separately from the motor.

14. The accumulator of claim 10, wherein the fluid system is hydraulic fluid system.

15. The accumulator of claim 10, wherein the motor is a transverse flux motor.

16. A fluid system, comprising:
a fluid-driven actuator;
a pump that is fluidly connected to the fluid-driven actuator;
an accumulator fluidly connected to the pump, the accumulator having,
a shell that defines an interior volume,
an accumulator shaft extending at least partially across the interior volume from a first interior surface of the shell,
a piston-plate disposed in the interior volume such that the piston-plate and a second interior surface of the shell define a chamber in the interior volume, the chamber configured to be in fluid communication with the fluid system during operation of the piston-plate, and
a motor coupled to the piston-plate; and
a controller that controls the motor to establish the position of the piston-plate along the accumulator shaft to control at least one of a magnitude, a direction or a duration of at least one of a pressure boost or a flow boost in the system,
wherein an interface between the shell and at least one of the motor or piston-plate is a threaded interface and allows the piston-plate to linearly travel along the shell.

17. The fluid system of claim 16, wherein the motor includes a shaft and an interface between the motor shaft and the accumulator shaft prevents rotation movement of the motor shaft relative to the accumulator shaft.

18. The fluid system of claim 16, wherein the motor is disposed in the interior volume between the first interior surface of the shell and the piston-plate.

19. The fluid system of claim 16, wherein the motor is a transverse flux motor.

* * * * *